United States Patent
Hwang et al.

(10) Patent No.: US 10,437,529 B1
(45) Date of Patent: Oct. 8, 2019

(54) PRINT JOB ROUTE BASED ON CONTEXT DATA

(71) Applicant: Hewlett-Packard Development Company, L.P., Houston, TX (US)

(72) Inventors: Peter G. Hwang, Vancouver, WA (US); Hunter John Simington, Boise, ID (US); Michael St Laurent, Baden (CA)

(73) Assignee: Hewlett-Packard Development Company, LP., Spring, TX (US)

( * ) Notice: Subject to any disclaimer, the term of this patent is extended or adjusted under 35 U.S.C. 154(b) by 0 days.

(21) Appl. No.: 15/942,146

(22) Filed: Mar. 30, 2018

(51) Int. Cl.
*G06F 3/12* (2006.01)

(52) U.S. Cl.
CPC .......... *G06F 3/1222* (2013.01); *G06F 3/1231* (2013.01); *G06F 3/1236* (2013.01); *G06F 3/1287* (2013.01)

(58) Field of Classification Search
CPC .............................. G06F 3/1288; G06F 3/1292
See application file for complete search history.

(56) References Cited

U.S. PATENT DOCUMENTS

| | | | |
|---|---|---|---|
| 8,699,056 B2 | 4/2014 | Shudo | |
| 9,025,192 B1* | 5/2015 | Majid | G06F 3/1204 358/1.15 |
| 9,602,683 B2 | 3/2017 | Park et al. | |
| 9,753,684 B1 | 9/2017 | Najari et al. | |
| 2008/0259399 A1* | 10/2008 | Wada | G06F 3/1204 358/1.15 |
| 2012/0127512 A1 | 5/2012 | Kay et al. | |
| 2012/0250074 A1* | 10/2012 | Kamppari | G06F 3/1204 358/1.15 |
| 2013/0260683 A1* | 10/2013 | Suzuki | H04W 76/10 455/41.1 |
| 2014/0211252 A1* | 7/2014 | Tsujimoto | H04W 4/80 358/1.15 |
| 2015/0070725 A1* | 3/2015 | Monden | G06F 3/1232 358/1.15 |
| 2015/0109638 A1* | 4/2015 | Sasaki | G06F 3/1205 358/1.15 |
| 2016/0085489 A1* | 3/2016 | Hansen | G06F 3/1204 358/1.15 |
| 2017/0054859 A1* | 2/2017 | Zehler | H04N 1/00244 |
| 2017/0126671 A1* | 5/2017 | Haapanen | H04B 17/318 |
| 2017/0228198 A1 | 8/2017 | Koormamtharayil et al. | |
| 2017/0230536 A1* | 8/2017 | Haapanen | H04W 76/14 |

* cited by examiner

*Primary Examiner* — Benjamin O Dulaney
(74) *Attorney, Agent, or Firm* — Perry + Currier (57) ABSTRACT

An example of an apparatus includes a network interface to receive print data and context data associated with a portable computing device. The apparatus includes a memory storage unit to store the print and context data, wherein the memory storage unit includes a database of printing devices. The apparatus includes a processor to monitor the context data and to select a printing device from the database based on the context data. The apparatus includes a security evaluation engine to determine whether the printing device and the portable computing device are connected via a secure network. The apparatus includes a print engine to route a print job generated from the print data automatically to the printing device when the printing device and the portable computing device are connected via the secure network and to store the print job in a queue when the printing device is outside the secure network.

12 Claims, 5 Drawing Sheets

PRINT JOB ROUTE BASED ON CONTEXT DATA

BACKGROUND

Printed documents are often used to present information. In particular, printed documents continue to be used despite the availability of electronic alternatives as they are more easily handled and read by users. Accordingly, the generation of printed documents remains an important tool for the presentation and handling of information. Printers are known and have been used to generate documents based on information received via a network.

BRIEF DESCRIPTION OF THE DRAWINGS

Reference will now be made, by way of example only, to the accompanying drawings in which.

DETAILED DESCRIPTION

Printed documents may be widely accepted and may often be more convenient to use. In particular, printed documents are easy to distribute, store, and be used as a medium for disseminating information. In addition, printed documents may serve as contingency for electronically stored documents, such as may happen when an electronic device fails, such as with a poor data connection for downloading the document and/or a depleted power source. When printing documents, documents are often generated at a printing device based on data received from a computing device. If the user generating the document is not in the vicinity of the printing device, the document may be generated and left at the printing device until collected by the user. It is to be appreciated that this may present a security problem as the document is left unattended for a period of time. This may be especially a concern in an environment where multiple printing devices are provided such that a document may be generating by a printing device in error and the document never picked up by the user.

A solution to address the security concern is to implement pull printing where a print job is held in a print queue until a user is physically present at the printing device where the document is to be generated. Once at the printing device, the user may be authenticated using various means, such as by entering a personal identification number into the printing device, a username and password, or with an identification card, badge, or biometric authentication method. Upon authentication, the print job is retrieved or "pulled" from the print queue and the document is generated by the printing device. Although pull printing provides additional security to reduce the likelihood of a document to be obtained by an unauthorized party, pull printing may be an impediment to productivity as users spend additional time authenticating as well as waiting for the document to be generated by the printing device.

Figure 1:
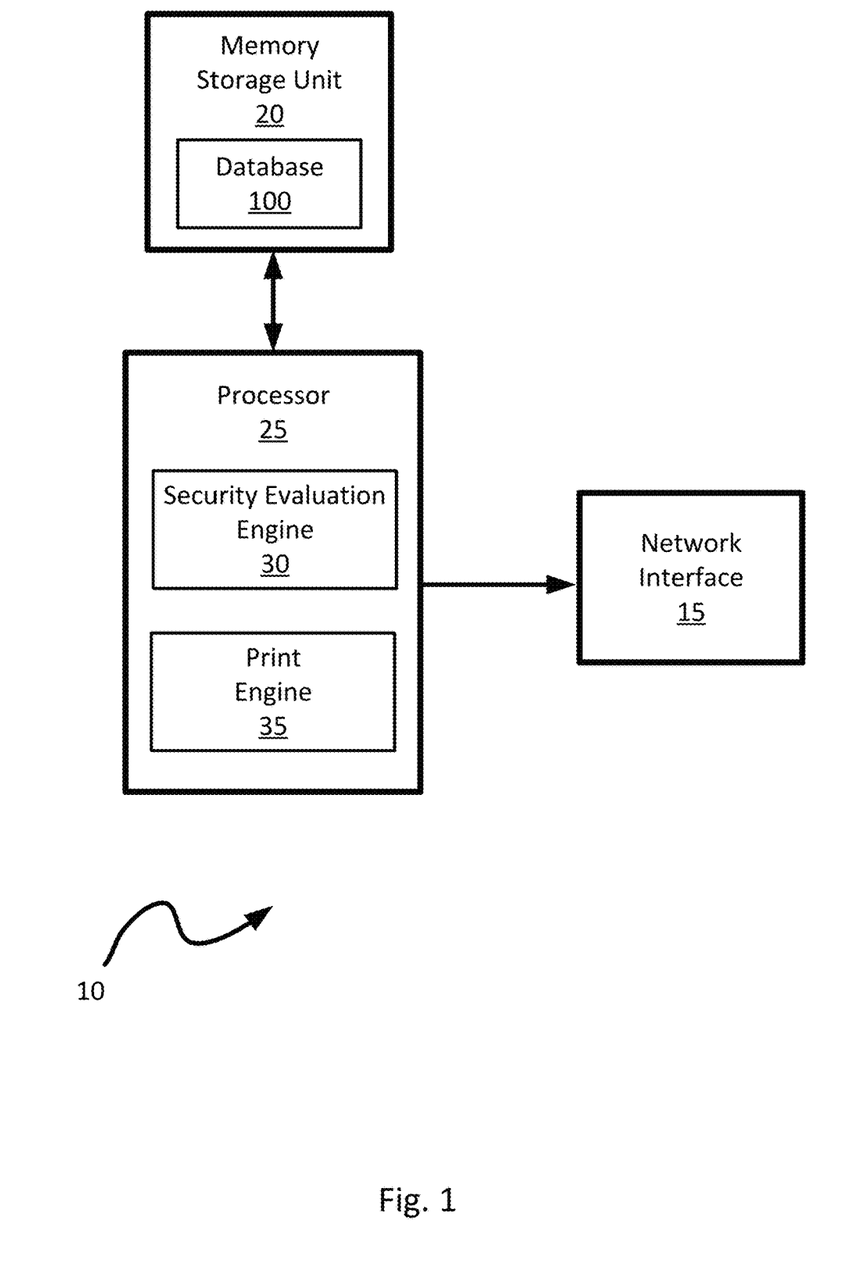
FIG. 1 is a block diagram of an example apparatus.

Referring to FIG. 1, an apparatus to handle print jobs across a network is shown at 10. The apparatus 10 may include additional components, such as various additional interfaces and/or input/output devices such as displays to interact with a user or an administrator of the apparatus 10. The apparatus 10 is to receive a print job from the network, such as from a portable computing device, and to transmit the print job to a printing device. In the present example, the apparatus 10 includes a network interface 15, a memory storage unit 20, and a processor 25. The processor 25 may be to operate a security evaluation engine 30 and a print engine 35 as well as carry out a set of instructions associated with an operating system.

The network interface 15 is to communicate with a network such as a wired or wireless network which may include a cellular network. In the present example, the network interface 15 is to receive print data, which may represent a print job, and context data via the network. The print data and the context data are associated with a portable computing device. For example, the print data may be generated by the portable computing device and received at the network interface 15 via the network. As another example, the print data may be generated at another device associated with the portable computing device. In this example, the other device may be a workstation or personal computer of a user that owns the portable computing device, such as a smartphone.

The context data may be provided by the portable computing device and may provide information such as the location of a user. In other examples, the context data may also be generated and provided by other computing devices, such as a workstation or personal computer. In this example, it is understood that the portable computing device may be used to provide the location of the user. Accordingly, the context data may change over time and updated context data may be received periodically. For example, the portable computing device may be equipped with global positioning system locating services or may be capable of communication with locating devices such as a Bluetooth Low Energy beacon. In another example, the context data may include a network identifier, such as the identifier of the secure network, to indicate that the portable computing device is connected to a secure network. In other examples, the context data may also include other information about a user such as a security clearance level or an authorization period for a specific network. Context data may also include the time of day, business hours, calendar information from the portable computing device, and security metadata associated with the print data.

The memory storage unit 20 is coupled to the processor 25 and may include a non-transitory machine-readable storage medium that may be any electronic, magnetic, optical, or other physical storage device. In the present example, the memory storage unit 20 stores the print data received at the network interface 15 as well as the context data received at the network interface 15.

In the present example, the non-transitory machine-readable storage medium may include, for example, random access memory (RAM), electrically-erasable programmable read-only memory (EEPROM), flash memory, a storage drive, an optical disc, and the like. The memory storage unit 20 may also be encoded with executable instructions to operate the network interface 15 and other hardware in communication with the processor 25. In other examples, it is to be appreciated that the memory storage unit 20 may be substituted with a cloud based storage system.

The memory storage unit 20 may also store an operating system that is executable by the processor 25 to provide general functionality to the apparatus 10, for example, functionality to support various applications such as a user interface to access various features of the apparatus 10.

Examples of operating systems include Windows™, macOS™, iOS™, Android™, Linux™' and Unix™. The memory storage unit 20 may additionally store applications that are executable by the processor 25 to provide specific functionality to the apparatus 10, such as those described in greater detail below.

The memory storage unit 20 also includes a database 100 to store information relating to a plurality of printing devices. For example, the database 100 may include a list of the printing devices along with an identifier for each printing device, such as a media access control address, as well as characteristics of each printing device, such as duplex capabilities, color printing capabilities, and other finishing options. In addition, the database 100 may include information on the location of the printing device and whether the printing device may be part of a secure network. Other data included in the database 100 may be additional characteristics of the printing device, such as status of the printing device, printing speed, duty cycle, paper capacity, amount of paper, amount of ink, current print queue status, cost per page, number of pages left on a contract, whether the printing device is on a metered connection (e.g., a cellular connection on which data may have associated cost), and device ownership.

The memory storage unit 20 may also store additional executable instructions for the operation of the apparatus 10. In the present example, the executable instructions may include a set of instructions for the processor 25 to run in order to operate the security evaluation engine 30 and/or the print engine 35.

The processor 25 may include a central processing unit (CPU), a microcontroller, a microprocessor, a processing core, a field-programmable gate array (FPGA), or similar. The processor 25 and memory storage unit 20 may cooperate to execute various instructions. In this example, the processor 25 also maintains and operates a security evaluation engine 30 to determine if a printing device is in a secure environment, such as when the printing device and the portable computing device are connected via a secure network. The secure network is not particularly limited and may be determined using the context data received at the network interface 15. In the present example, the secure network may be wired or wireless. For example, the local area network may be an example of a secure network.

The processor 25 also maintains and operates a print engine 35 to route a print job generated from the print data to a printing device. In the present example, the print engine 35 automatically routes the print job to the printing device when the printing device and the portable computing device are connected via a secure network. The secure network may be a private local area network in some examples. In other examples, the secure network may be a direct connection between the portable computing device and the printing device, such as via a Bluetooth connection to indicate that the user and is close enough to the printing device to collect the document after it is generated. In situations when the printing device or outside of the secure network, or when the portable computing device cannot connect to the printing device using the secure network, the print job is stored in a queue.

Accordingly, the processor 25 may execute instructions stored on the memory storage unit 20 to implement the security evaluation engine 30 and the print engine 35 and to handle and manage the print jobs across a network. In other examples, the security evaluation engine 30 may be substituted with an external engine, such as another server or machine. In another example, the security evaluation engine 30 may be substituted with an external engine, such as from a software as a service provider specializing in the security management for an organization. Similarly, the print engine 35 may be substituted with an external engine, such as another server or machine. Such examples may be common in larger systems where a single server or machine may not be able to process the print jobs and still carry out the functions of the apparatus 10 in a reasonable manner.

The processor 25 is also to control the network interface 15. In particular, the processor 25 may send instructions to the network interface 15 to receive the print data and the context data. For example, the processor 25 is to monitor the context data received associated with the portable computing device. In particular, the processor 25 may periodically send requests to the portable computing device to request an update for the context data. In other examples, the portable computing device may automatically send updates in the context data to the apparatus 10. It is to be appreciated that such examples may reduce the amount of data transmitted between the portable computing device to conserve energy and prolong battery life. Accordingly, the portable computing device may only send updated context data when a substantial change such as a large change in location or if the portable computing device connects with a different network. It is to be appreciated that the threshold for what may be considered a substantial change is not particularly limited and may be set based on various factors.

The processor 25 is also to select a printing device from the database 100 of printing devices based on the context data received from the portable computing device via the network interface 15. The manner by which the processor 25 selects the printing device is not limited and may include analyzing the context data, such as location data, to determine the nearest printing device to the location of the portable computing device. In some examples, the processor 25 may delay the selection of the printing device until the portable computing device is within a threshold distance of a printing device. In cases where the portable computing device is within the threshold distance of more than one printing device, the processor 25 may present an option on a user interface of the portable computing device in some examples or may further evaluate the context data to make a selection. For example, the context data may include a preferred printing device. In another example, the context data may include behavior patterns of the user or determine a direction the user is moving to select a printing device that is on route and requiring a smaller detour. In this example, if a user is walking from his office to a meeting room, the processor 25 will select a printing device closest to the walking route between the office and the meeting room such that the user makes the smaller detour.

Figure 2:
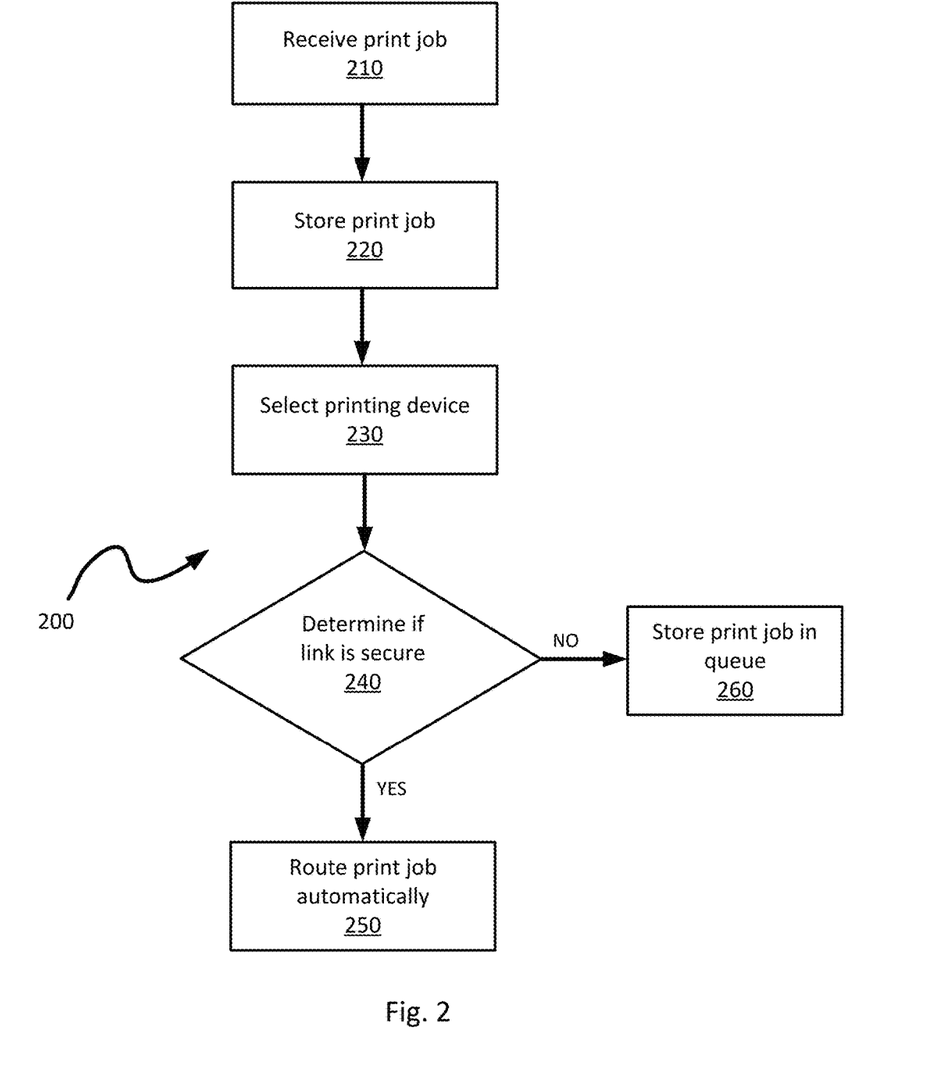
FIG. 2 is a flowchart of an example of a method.

Referring to FIG. 2, a flowchart of a method to handle print jobs across a network is shown at 200. In order to assist in the explanation of method 200, it will be assumed that method 200 may be performed with the apparatus 10, and specifically by the processor 25. Indeed, the method 200 may be one way in which apparatus 10 may be configured. Furthermore, the following discussion of method 200 may lead to a further understanding of the processor 25, and apparatus 10 and its various components. Furthermore, it is to be emphasized, that method 200 need not be performed in the exact sequence as shown, and various blocks may be performed in parallel rather than in sequence, or in a different sequence altogether.

Beginning at block 210, the processor 25 receives a print job from a computing device via the network interface 15. The manner by which the print job is received from the computing device is not particularly limited. In the present example, the network interface 15 may receive print data from a network containing the print job.

Block 220 involves the processor 25 to store the print job received at block 210 in the memory storage unit 20. The manner by which the print job is stored by the processor 25 is not particularly limited. For example, the print job may be stored in a database or queue of the memory storage unit 20. It is to be appreciated that that processor 25 may receive multiple print jobs from multiple computing devices that may be associated with different user accounts. For example, if the apparatus 10 is a print server, the apparatus 10 may be used to collect all print jobs and manage sending the print jobs to various printing devices for generating documents. Therefore, the memory storage unit 20 may include multiple databases and queues to organize the print jobs that are received via the network.

Next, block 230 involves the selection of a printing device for the print job. The printing device is to be selected from a database of printing devices stored on the memory storage unit 20. In the present example, the selection is carried out by the processor 25 based on location data received from a portable computing device, which is different from the computing device from which the print job originated. Accordingly, in this example, the print job is received at the processor from one computing device and the location data is received from another computing device.

In most situations, it is to be understood that the first computing device from which the print job is received may be a workstation or personal computer on which a user performs the majority of work. For example, the user may be preparing a document in a word processing program and upon completion of the preparation document, send the document for printing. The user also possesses a second portable computing device, such as a smartphone, that is kept on the person. When the portable computing device approaches a printing device, location data is provided to the processor 25 from the portable computing device. In other examples, additional locating devices (not shown) may be used to detect the portable computing device. The processor 25 may then selected the nearest printing device to portable computing device and selected that printing device.

In some examples, such as when the portable computing device is not close to any printing device, the processor 25 may delay the selection of the printing device until the portable computing device moves within a threshold distance or a predetermined range of a printing device, such as about 15 to 30 feet in a high security environment. In other environments, the range may be increased or decreased to achieve a desired level of security. In other examples, the threshold distance may be dependent on other facts, such as document size, printing device characteristics like printing speed, and/or the speed at which the portable computing device is approaching the printing device. In examples with a variable threshold distances, the apparatus may be tuned such that the user arrives at the printing device as the document printing is completed.

In cases where the portable computing device is within the threshold distance or the predetermined range of more than one printing device, the processor 25 may present an option to the user of the portable computing device in some examples. In other examples, the processor 25 may further evaluate the context data to make a selection. For example, the context data may include a preferred printing device. In another example, the context data may include behavior patterns of the user or determine a direction the user is moving to select a printing device that is on route and requiring a smaller detour. In this example, if a user is walking from his office to a meeting room, the processor 25 will select a printing device closest to the walking route between the office and the meeting room such that the user makes the smaller detour.

Block 240 involves an analysis of the link between the printing device and the first computing device from where the print job originated. In the present example, the processor 25 analyzes the link to determine whether the link is secure. For example, a link may be considered secure when the network covers a private and/or locked area, such as a floor or portion of a floor in an office building or a private residence. Secure Sockets Layer (SSL) communications may be used. An identity of a device may be validated via manufacturer embedded certificates, such as facilitated by a Trusted Platform Module (TPM) chip.

Continuing with the present example, if the link is determined to be secure, the method 200 proceeds to step 250 where the processor 25 routes the print job automatically to the printing device selected at block 230. Since the computing device from which the print job originated and the printing device share a secure link, it is assumed that the computing device and the printing device are within the same secure environment such that documents generated at the printing device remains secure even if the user does not retrieve the documents from the printing device.

If the link is determined to be unsecure, the method 200 proceeds to step 260 and where the processor 25 stores the print job in a queue. In the present example, the queue is maintained in the memory storage unit 20. In other examples, the queue may be maintained on a separate memory unit or stored externally such as in the cloud. In the present example, the print job may be stored until a different printing device is selected from block 230. Alternatively, the print job may be made available at the printing device connected via an unsecure link through a pull printing process.

Figure 3:
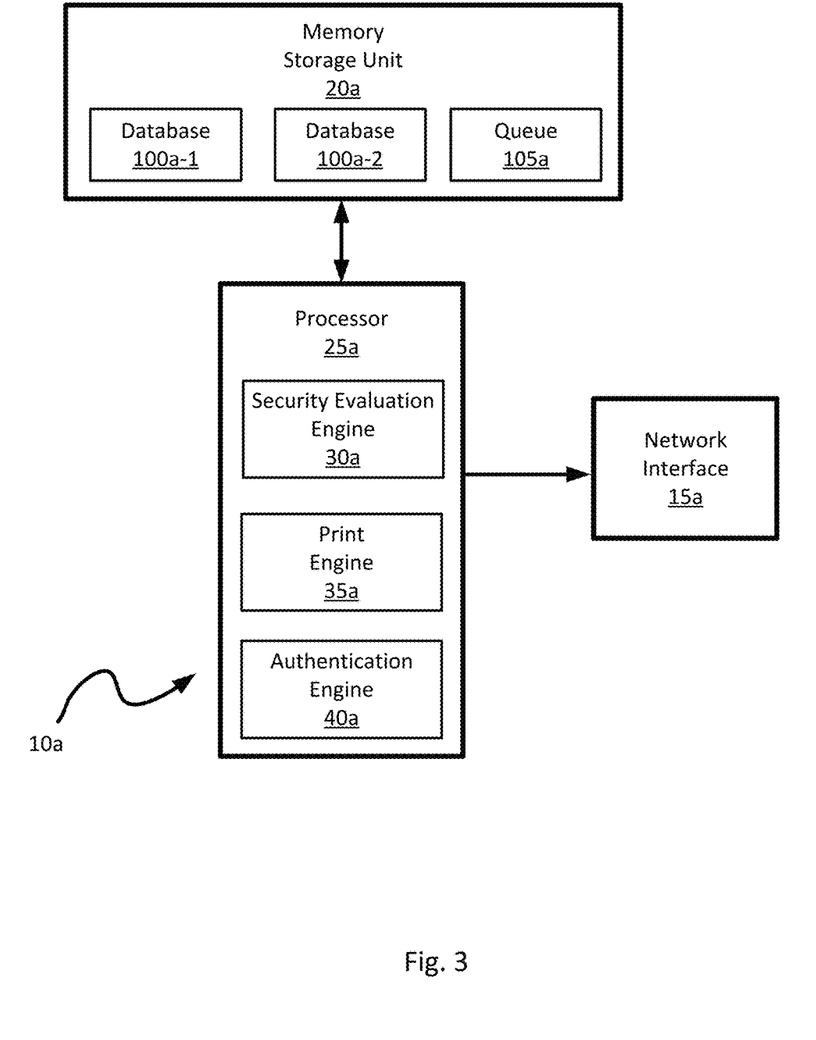
FIG. 3 is a block diagram of another example apparatus.

Referring to FIG. 3, another example of an apparatus to handle print jobs across a network is shown at 10a. Like components of the apparatus 10a bear like reference to their counterparts in the apparatus 10, except followed by the suffix "a". The apparatus 10a includes a network interface 15a, a memory storage unit 20a, and a processor 25a. The processor 25a may be to operate a security evaluation engine 30a, a print engine 35a, and an authentication engine 40a as well as carry out a set of instructions to operate the apparatus 10a in general. Furthermore, the apparatus 10a is another example that may be used to carry out the method 200.

The network interface 15a is to communicate with a network, such as a wireless network, to receive a print job from a portable computing device. In the present example, the portable computing device is not particularly limited and may be a laptop, smartphone, smartwatch, computer, tablet, or other electronic device capable of generating print jobs.

The memory storage unit 20a is coupled to the processor 25a and may include a non-transitory machine-readable storage medium that may be any electronic, magnetic, optical, or other physical storage device. In the present example, the memory storage unit 20a stores the print data received at the network interface 15a from the portable computing device.

The non-transitory machine-readable storage medium may include, for example, random access memory (RAM), electrically-erasable programmable read-only memory (EEPROM), flash memory, a storage drive, an optical disc, and the like. The memory storage unit 20a may also be encoded with executable instructions to operate the network interface 15a and other hardware, such as various input and output devices like a monitor, keyboard or pointing device to allow a user or administrator to operate the apparatus 10a.

The memory storage unit 20a may also store an operating system that is executable by the processor 25a to provide general functionality to the apparatus 10a, for example, functionality to support various applications such as a user interface to access various features of the apparatus 10a. Examples of operating systems include Windows™ macOS™, iOS™, Android™ Linux™ and Unix™. The memory storage unit 20a may additionally store applications that are executable by the processor 25a to provide specific functionality to the apparatus 10a.

In the present example, the memory storage unit 20a includes databases 100a-1 and 100a-2 (generically, these databases are referred to herein as "database 100a" and collectively they are referred to as "databases 100a", this nomenclature is used elsewhere in this description). The database 100a-1 may be to store information relating to a plurality of printing devices. For example, the database 100a-1 may include a list of the printing devices along with an identifier for each printing device, such as a media access control address, as well as characteristics of each printing device, such as duplex capabilities, color printing capabilities, and other finishing options. In addition, the database 100a-1 may include information on the location of the printing device and whether the printing device may be considered to be part of a secure network. The database 100a-2 may be to store information relating to an account of a user. For example, the database 100a-2 may include context data such as preferences associated with the user of the portable computing device, such as a preferred printing device. Other data that may be stored in the database 100a-2 may include behavior characteristics of the user such as work hours, job classification and duties, user assignments and projects, the user's trusted Wi-Fi networks, geolocation hotspots (e.g., user's work, home, etc.), printed content preferences (e.g., the user often prints to PDF, often prints Microsoft formatted documents, etc.) and/or whether a user has special accessibility considerations. It is to be appreciated that the context data stored in the database 100a-2 may be used by the processor 25a to select the printing device to which the print job is to be sent as well as to determine whether the link between the printing device and the portable computing device is secure. For example, if the portable computing device provides a print job outside of working hours associated with the user of the portable computing device, the processor 25a may determine that the printing device and the portable computing device no longer form a secure link since the user may not have access to the printing device.

The memory storage unit 20a may also store and maintain a print queue 105a. In the present example, the print queue 105a may be to store print jobs received via the network interface 15a. The print queue 105a is not particularly limited and may include multiple queues for multiple printing devices. In the present example, the print queue 105a may be used to store the print jobs when the link between the portable computing device and the printing device is not secure for subsequent pull printing.

Although the present example illustrates two databases 100a and a single print queue 105a, it is to be appreciated that the memory storage unit 20a is not particularly limited and that additional databases 100a may be maintained to store additional data. For example, an organization may have printing devices connected via various networks which may have different levels of security protocols. Accordingly, each group of printing devices connected to a single network may have information stored in a separate database 100a. Similarly, multiple queues 105a may be provide such that each printing device is associated with a single print queue 105a.

The processor 25a may include a central processing unit (CPU), a microcontroller, a microprocessor, a processing core, a field-programmable gate array (FPGA), or similar. The processor 25a and memory storage unit 20a may cooperate to execute various instructions. In this example, the processor 25a also maintains and operates a security evaluation engine 30a to determine if the link between the portable computing device and the printing device is secure.

The processor 25a also maintains and operates a print engine 35a to route a print job generated from the print data to a printing device. In the present example, the print engine 35a automatically routes the print job to the printing device when the printing device and the portable computing device are connected via a secure link.

In the present example, the processor 25a also maintains and operates an authentication engine 40a to determine authenticate a user on an unsecure printing device to provide for pull printing. For example, the authentication engine 40a may request some input from the user such a personal identification number, a username and password, an identification card, a badge, or a biometric scan. The processor 25a may compare the input from the user with authentication information stored in the memory storage device, such as in the database 100a-2. Once the user has been authenticated, the print engine 35a releases and routes the print job from the queue 105a to the unsecure printing device, which may be outside of a secure network.

Figure 4:
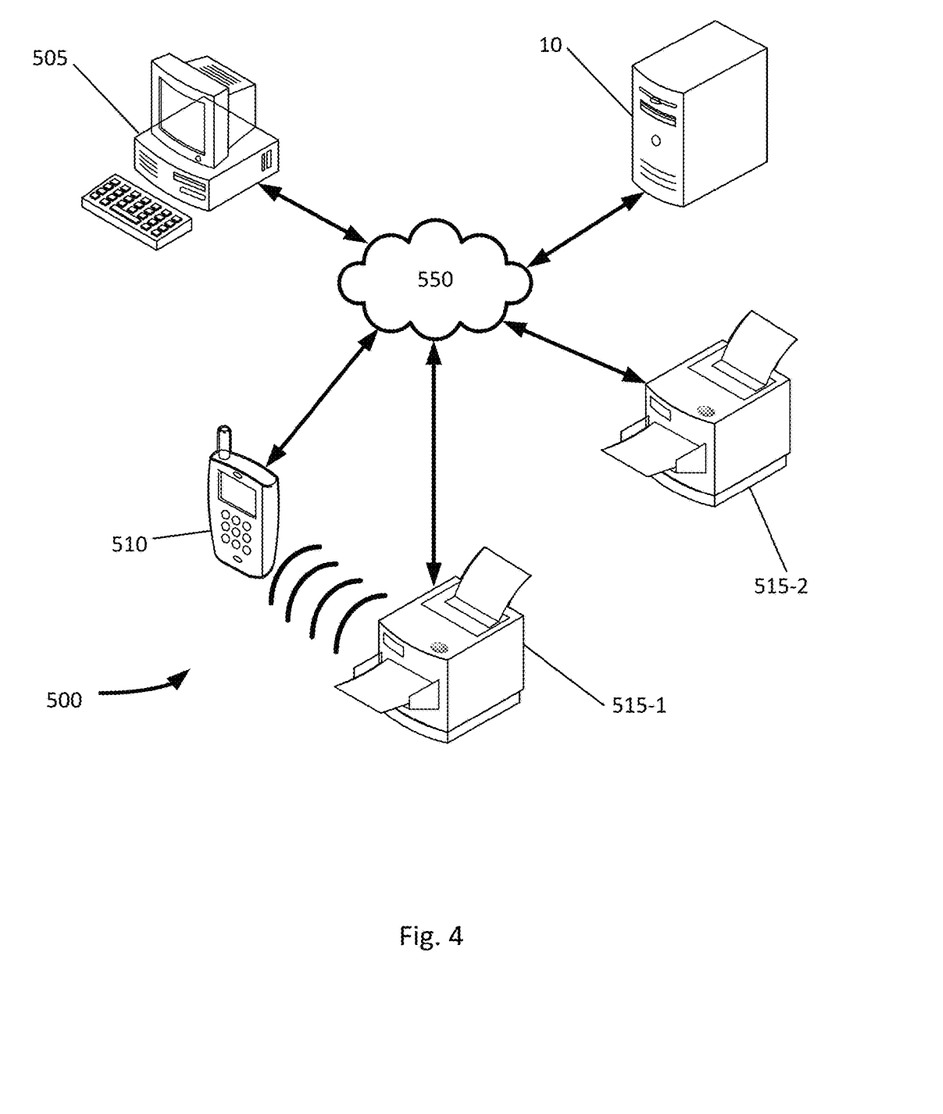
FIG. 4 is a schematic view of an implementation of the apparatus of FIG. 1.

Referring to FIG. 4, a schematic representation of a network system is generally shown at 500. The system 500 includes the apparatus 10, a computing device 505, such as a desktop computer, a portable computing device 510, such as a laptop, a smartphone, a smartwatch, a desktop computer, or a tablet, and printing devices 515-1 and 515-2. In this example, the apparatus 10, the computing device 505, the portable computing device 510, and the printing devices 515 are connected to the same network 550.

The network 550 in this example may be a local area network and may be wired, wireless, or a combination of wired and wireless. In the present example, the network 550 may be a secure network for providing a secure connection between devices connected to the network 550.

In operation, it may be assumed that a user of the computing device 505 send a print job to the apparatus 10 via the network 550 while the user is located near the computing device 505 to operate the computing device 505. In this example, the computing device 505 is beyond the threshold distance from any of the printing devices 515. For example, the computing device 505 may be located on a different floor from the printing devices 515. After sending the print job to the apparatus 10, the user may move toward the printing device 515-1 while carrying the portable computing device 510. Once the portable computing device 510 enters the range of the printing device 515-1, the apparatus 10 is notified and recognizes that the portable computing device 510 and the printing device 515-1 are connected via a secure link since they are both connected to the network 550. Accordingly, the apparatus 10 automatically routes the print job to the printing device 515-1 such that the generated documents will be available for pickup when the user with the portable computing device 510 arrives at the printing device 515-1.

In the present example, the manner by which the portable computing device 510 is recognized to be within the threshold distance or range of the printing device 515-1 is not particularly limited. For example, the portable computing device may be equipped with global positioning system locating services or may be capable of communication with locating devices such as a Bluetooth Low Energy beacon. In other examples, the signal strength of a wireless network may be used to locate the portable computing device via triangulation techniques. Once the portable computing device 510 or the printing device 515-1 recognizes that each are within range of the other, one of the portable computing device 510 or the printing device 515-1.

Figure 5:
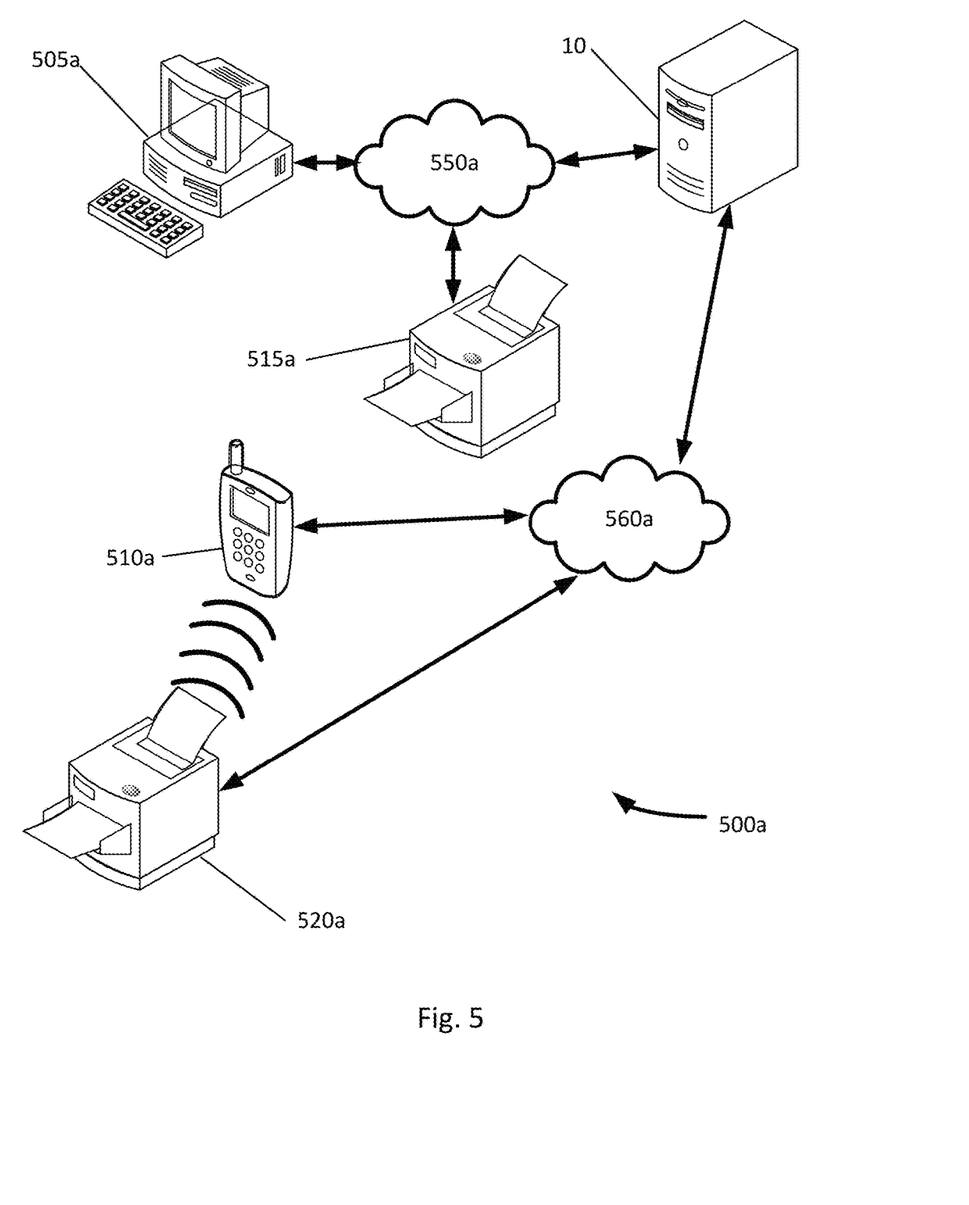
FIG. 5 is a schematic view of another implementation of the apparatus of FIG. 1.

Referring to FIG. 5, a schematic representation of a network system is generally shown at 500a. Like components of the system 500a bear like reference to their counterparts in the system 500, except followed by the suffix "a". The system 500a includes the apparatus 10, a computing device 505a, a portable computing device 510a, and printing devices 515a and 520a. In this example, the apparatus 10, the computing device 505a, and the printing device 515a are connected to the same network 550a. The apparatus 10 is also connected to an external network 560a, such as a public network or the Internet, as wells as the portable computing device 510a and the printing device 520a.

The network 550a in this example may be a local area network and may be wired, wireless, or a combination of wired and wireless. In the present example, the network 550a may be a secure network for providing a secure connection between devices connected to the network 550a. As an example, the network 550a may be a secured office network.

The network 560a may be a public network or the Internet. In this example, the network 560a maintains a connection to the apparatus 10 such that the apparatus 10 may still send and receive messages to external devices. This allows a user to leave the secure network area and still be able to communication with the apparatus 10 when the user is away from the office to provide a mechanism for remote working.

In operation, it may be assumed that a user of the computing device 505a send a print job to the apparatus 10 via the network 550a while the user is located near the computing device 505a to operate the computing device 505a. In this example, the computing device 505a is beyond the threshold distance from any of the printing device 515a. For example, the computing device 505a may be located on a different floor from the printing device 515a. After sending the print job to the apparatus 10, the user may have to leave the office building or otherwise leave the area covered by the network 550a, such as if travelling to a client meeting or home. Once the portable computing device 510a enters the range of the printing device 520a, such as a printing device in a remote location capable of communicating with the apparatus 10, a notification is received at the apparatus 10 that the portable computing device 510a is within range of an unsecured printing device 520a since they are no longer connected by what is considered a secure link by the apparatus 10. Accordingly, the print job stored at the apparatus 10 may be made available to for printing at the printing device 520 using a pull printing process.

It should be recognized that features and aspects of the various examples provided above may be combined into further examples that also fall within the scope of the present disclosure.

What is claimed is:

1. An apparatus comprising:
    a network interface to receive print data and context data associated with a portable computing device;
    a memory storage unit to store the print data and the context data, wherein the memory storage unit also includes a database of printing devices;
    a processor to monitor the context data and to select a printing device from the database of printing devices based on the context data;
    a security evaluation engine to determine whether the printing device and the portable computing device are connected via a secure network; and
    a print engine to route a print job generated from the print data automatically to the printing device when the printing device and the portable computing device are connected via the secure network, the print engine to store the print job in a queue when the printing device is outside the secure network.

2. The apparatus of claim 1, wherein the security evaluation engine uses the context data to determine whether the printing device and the portable computing device are connected via the secure network.

3. The apparatus of claim 2, wherein the context data includes a network identifier of the secure network.

4. The apparatus of claim 1, wherein the secure network is a wireless network and context data includes location data associated with the portable computing device.

5. The apparatus of claim 4, wherein the processor uses the location data to select the printing device.

6. The apparatus of claim 5, wherein the location data includes a signal strength of the wireless network to locate the portable computing device.

7. The apparatus of claim 1, wherein the print engine is to release the print job in the queue upon authentication when the printing device is outside the secure network.

8. A non-transitory machine-readable storage medium encoded with instructions executable by a processor, the non-transitory machine-readable storage medium comprising:
    instructions to receive, via a network interface, a print job from a portable computing device;
    instructions to store the print job in a memory storage unit, wherein the memory storage unit also includes a database of printing devices;
    instructions to select a printing device from the database of printing devices based on location data received from the portable computing device;
    instructions to analyze a link between the printing device and the portable computing device to determine whether the link is secure;
    instructions to route the print job automatically to the printing device when the link is secure; and
    instructions to store the print job in a queue when the link is unsecure.

9. The non-transitory machine-readable storage medium of claim 8, wherein the instructions to analyze the link uses the location data to determine whether the link is secure.

10. The non-transitory machine-readable storage medium of claim 9, wherein the location data includes a network address of a wireless network obtained from a network detector.

11. The non-transitory machine-readable storage medium of claim 10, wherein location data includes a signal strength of the wireless network detected by the portable computing device.

12. The non-transitory machine-readable storage medium of claim 8, comprising instructions to route the print job in the queue to the printing device upon authentication when the link is unsecure.

\* \* \* \* \*